(12) United States Patent
Baer et al.

(10) Patent No.: US 10,206,191 B2
(45) Date of Patent: Feb. 12, 2019

(54) CIRCUIT ARRANGEMENT AND METHOD FOR DETERMINING A MOBILE RADIO CELL TIMING

(71) Applicant: Intel IP Corporation, Santa Clara, CA (US)

(72) Inventors: Siegfried Baer, Nürnberg (DE); Pouyan Parvazi, Dresden (DE)

(73) Assignee: Intel IP Corporation, Santa Clara, CA (US)

( * ) Notice: Subject to any disclaimer, the term of this patent is extended or adjusted under 35 U.S.C. 154(b) by 19 days.

(21) Appl. No.: 15/354,010

(22) Filed: Nov. 17, 2016

(65) Prior Publication Data
US 2017/0181111 A1    Jun. 22, 2017

(30) Foreign Application Priority Data

Dec. 22, 2015   (EP) ..................................... 15201958

(51) Int. Cl.
| | |
|---|---|
| *H04W 56/00* | (2009.01) |
| *H04W 76/27* | (2018.01) |
| *H04L 5/14* | (2006.01) |
| *H04W 68/00* | (2009.01) |
| *H04W 72/04* | (2009.01) |
| *H04L 5/00* | (2006.01) |
| *H04W 84/04* | (2009.01) |
| *H04W 88/02* | (2009.01) |

(52) U.S. Cl.
CPC ............. *H04W 56/002* (2013.01); *H04L 5/14* (2013.01); *H04W 68/005* (2013.01); *H04W 72/0446* (2013.01); *H04W 76/27* (2018.02); *H04L 5/0007* (2013.01); *H04W 84/042* (2013.01); *H04W 88/02* (2013.01)

(58) Field of Classification Search
CPC . H04W 56/002; H04W 76/27; H04W 76/046; H04W 72/0446; H04W 68/005; H04W 84/042; H04W 88/02; H04L 5/14; H04L 5/0007

See application file for complete search history.

(56) References Cited

U.S. PATENT DOCUMENTS

| | | | | |
|---|---|---|---|---|
| 2014/0301263 | A1* | 10/2014 | Ji ...................... | H04W 52/0216 370/311 |
| 2015/0098381 | A1* | 4/2015 | Cucala Garc a .. | H04W 52/0216 370/311 |

* cited by examiner

*Primary Examiner* — Thai Nguyen

(74) *Attorney, Agent, or Firm* — Schwegman Lundberg & Woessner, P.A.

(57) ABSTRACT

A circuit arrangement for determining a mobile radio cell timing is provided. The circuit arrangement may include a receiver configured to receive a paging signal in accordance with a predetermined cell timing, and one or more synchronization signals, a receiver activating/deactivating circuit configured to activate the receiver for a predetermined time period to receive the paging signal in accordance with a previous paging signal cycle, and further configured to deactivate the receiver after the predetermined time period has lapsed, a cell detection circuit configured to execute during the predetermined time period a cell detection procedure using the one or more synchronization signals, thereby determining an updated cell timing, and a memory configured to store the updated cell timing.

25 Claims, 6 Drawing Sheets

CIRCUIT ARRANGEMENT AND METHOD FOR DETERMINING A MOBILE RADIO CELL TIMING

This application claims the benefit of priority to European Patent Application No. 15201958.4, filed Dec. 22, 2015, which is incorporated herein by reference in its entirety.

TECHNICAL FIELD

Various aspects of this disclosure generally relate to a circuit arrangement, a mobile radio communication terminal device and a method for determining a mobile radio cell timing.

BACKGROUND

Long Term Evolution (LTE) communications network deployment conventionally may use repeaters to extend the coverage of e.g. a so-called mobile radio macrocell.

These repeaters receive the LTE signal, amplify it and re-transmit it on exactly the same carrier frequency as an eNodeB (which is an LTE mobile radio base station). The signal processing usually introduces a delay in the signal. A typical value for repeaters operating in Universal Mobile Telecommunications System (UMTS) is provided as 5 μs, but practical experience in an operating 3G Korean communications network indicates values of up to 30 μs.

Any receiver passing the overlapping areas of the macrocell and the repeater will observe a time jump of the mobile radio serving cell and needs to correct the receiver timing to keep synchronized to the network, if possible without any service interruptions. In the so-called Radio Resource Control (RRC) IDLE state, the LTE receiver needs only to receive the so-called paging channel in every paging cycle, which can either be 320 ms, 640 ms, 1280 ms or 2560 ms to reduce overall power consumption.

Conventional receiver algorithms might not be capable to handle larger time shifts and fail to receive the paging channel. This usually requires either to execute power consuming re-synchronization methods or perform a mobile radio cell re-selection procedure.

SUMMARY

A circuit arrangement for determining a mobile radio cell timing is provided. The circuit arrangement may include a receiver configured to receive a paging signal in accordance with a predetermined cell timing, and one or more synchronization signals, a receiver activating/deactivating circuit configured to activate the receiver for a predetermined time period to receive the paging signal in accordance with a previous paging signal cycle, and further configured to deactivate the receiver after the predetermined time period has lapsed, a cell detection circuit configured to execute during the predetermined time period a cell detection procedure using the one or more synchronization signals, thereby determining an updated cell timing, and a memory configured to store the updated cell timing.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
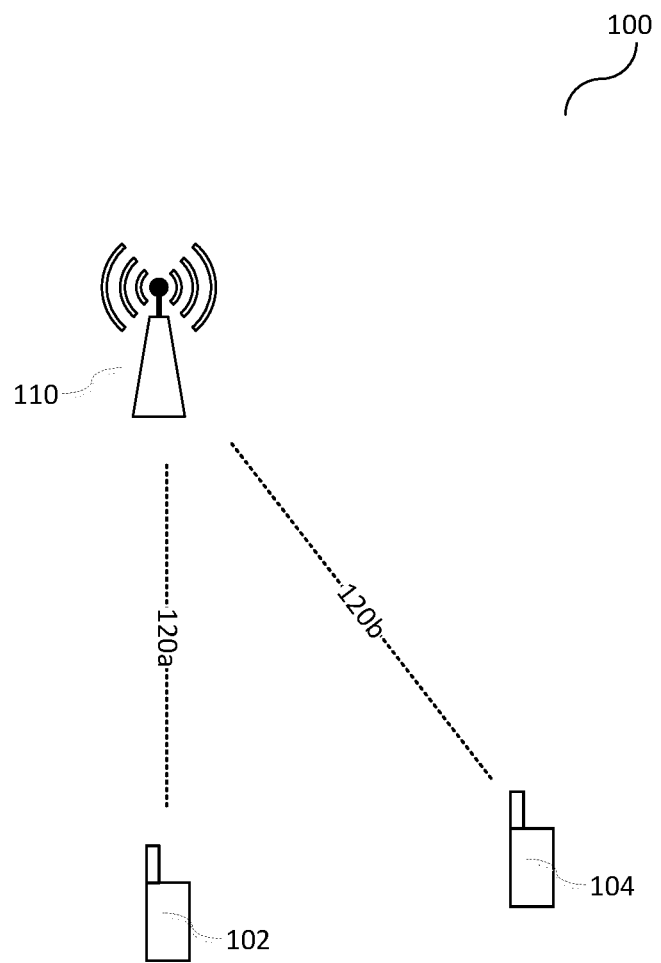
FIG. 1 shows a mobile radio communication network.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

In an aspect of this disclosure, a "circuit" may be understood as any kind of a logic implementing entity, which may be hardware, software, firmware, or any combination thereof. Thus, in an aspect of this disclosure, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be software being implemented or executed by a processor, e.g. any kind of computer program, e.g. a computer program using a virtual machine code such as, e.g. Java. Any other kind of implementation of the respective functions which will be described in more detail below may also be understood as a "circuit" in accordance with an aspect of this disclosure.

The terms "coupling" or "connection" are intended to include a direct "coupling" or direct "connection" as well as an indirect "coupling" or indirect "connection" respectively.

The term "protocol" is intended to include any piece of software and/or hardware, that is provided to implement part of any layer of the communication definition. "Protocol" may include the functionality of one or more of the following layers: physical layer (layer 1), data link layer (layer 2), network layer (layer 3), or any other sub-layer of the mentioned layers or any upper layer.

The communication protocol layers and its respective entities which will be described in the following may be implemented in hardware, in software, in firmware, or partially in hardware, and/or partially in software, and/or partially in firmware. In an aspect of this disclosure, one or more communication protocol layers and its respective entities may be implemented by one or more circuits. In an aspect of this disclosure, at least two communication protocol layers may be commonly implemented by one or more circuits.

Unless explicitly specified, the terms "transmit" and "send" encompass both direct and indirect transmission/sending. Similarly, the term "receive" encompasses both direct and indirect reception unless explicitly specified. As utilized herein, the term "derived from" designates being obtained directly or indirectly from a specific source. Accordingly, data derived from a source includes data obtained directly from the source or indirectly from the source (e.g. through one or more secondary agents).

As used herein, a "cell" in the context of telecommunications may be understood as a sector served by a base station, e.g. an eNodeB. Accordingly, a cell may be a set of geographically co-located antennas that correspond to a particular sectorization of a base station. A base station may thus serve one or more "cells" (or sectors), where each cell is characterized by a distinct communication channel. Furthermore, the term "cell" may be utilized to refer to any of a macrocell, microcell, femtocell, picocell, etc.

Although various aspects of this disclosure are described in connection with Long Term Evolution (LTE) or LTE Advanced (LTE-A) mobile radio communications network, it is to be noted that this should not be considered limiting. Various aspects of this disclosure may also be applied in any mobile radio communications network in which a similar scenario as described in the following may occur.

One possible solution for mobile radio cell synchronisation is to execute frequently cell search, like every paging cycle without taking any a-priori information into account. This includes to execute a search over a number of radio samples that contain under all possible conditions at least each synchronization signal, which is 5.4 ms to cover at least one full pair of synchronization channels (Primary Synchronization Signal (PSS) and Secondary Synchronization Signal (SSS)). This would be required even in a situation where the UE is not obliged to search for neighbor cells due to good channel conditions.

Various aspects of this disclosure may make use of Long Termin Evolution (LTE) signals (or LTE-Advanced (LTE-A)) and radio channels and their time structure and assumptions of mobile radio cell timings to power efficiently detect any time shifts of the serving mobile radio cell. The paging channel requires to receive only one dedicated subframe of length 1 ms in a radio frame and to re-use the same radio samples to execute a limited mobile radio cell search based on primary and secondary synchronization signals of just 1 subframe of radio samples. As the timings of the main peak of the macrocell and of the repeater are within a certain time window, defined by the repeater introduced delay but still reliably contained within 1 ms of a subframe.

FIG. 1 shows mobile communication network 100, which includes one or more base stations, e.g. one or more eNodeBs 110, and a plurality of mobile terminals (also referred to a mobile radio communication terminal devices) 102, 104. Each of mobile terminals 102 and 104 may be served by a first mobile radio cell of base station 110, where base station 110 may be composed of one or more mobile radio cells (not explicitly shown denoted in FIG. 1), e.g. of one or more macrocell s. Mobile communication network 100 may be e.g. an LTE (Long Term Evolution) communication network (e.g. in accordance with LTE version 8, version 9, version 10, etc.). Furthermore, mobile communication network 100 may be e.g. an LTE-A (Long Term Evolution Advanced) communication network. However, it is understood that the description provided herein is considered applicable to various other mobile communication technologies, both existing and not yet formulated, e.g. cases where such mobile communication technologies share similar features as disclosed regarding the following examples. As mentioned above, one or more repeaters (not shown) may be provided in the connection path between base station 110 and mobile terminals 102 and 104, which may result in a change of the delay of a signal that mobile terminals 102 and 104 receive via a repeater as compared to the timing of a signal that mobile terminals 102 and 104 receive directly from base station 110.

As mentioned above, the repeater(s) may receive the LTE signal, may amplify it and may re-transmit it on exactly the same carrier frequency as an eNodeB. The signal processing in the repeater(s) thus usually introduce(s) a delay in the signal.

Any receiver passing the overlapping areas of the macrocell and the repeater will observe a time jump of the mobile radio serving cell and needs to correct the receiver timing to keep synchronized to the network, if possible without any service interruptions. In the so-called Radio Resource Control (RRC) IDLE state, the LTE receiver needs only to receive the so-called paging channel in every paging cycle, which can either be 320 ms, 640 ms, 1280 ms or 2560 ms to reduce overall power consumption.

Figure 2:
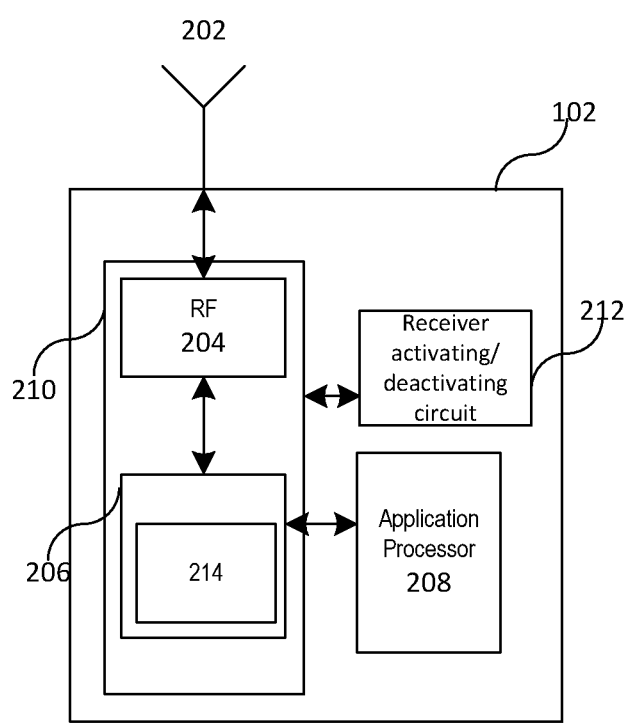
FIG. 2 shows an internal configuration of a mobile radio communication terminal device.

FIG. 2 shows a block diagram illustrating an internal configuration of mobile terminal 102 according to an aspect of the disclosure. Mobile terminal 104 may be configured in a similar manner.

As illustrated in FIG. 2, mobile terminal 102 may include antenna arrangement 202 (which may include one or more antennas, e.g. MIMO antennas), radio frequency (RF) transceiver circuitry 204 (which may include one or more RF transceiver circuits; each RF transceiver circuit 204 may include one or more receivers configured to receive a paging signal in accordance with a predetermined macrocell timing. The one or more receivers may further be configured to receive one or more synchronization signals) (the paging signal may be received together with the one or more synchronization signals, e.g. together with exactly one synchronization signal or e.g. together with exactly two synchronization signals). The mobile terminal 102 may further include baseband modem 206, and application processor 208. It is to be noted that RF transceiver circuitry 204 and baseband modem 206 may together form modem 210. Furthermore, mobile terminal 102 may include receiver activating/deactivating circuit 212 configured to activate the receiver (e.g. the modem 210 in its entirety or RF transceiver circuitry 204 and/or baseband modem 206 individually) to receive the paging signal in accordance with a previous paging signal cycle for a predetermined time period. Moreover, receiver activating/deactivating circuit 212 may be configured to de-activate the receiver (e.g. the modem 210 in its entirety or RF transceiver circuitry 204 and/or baseband modem 206 individually).

It is appreciated that the aforementioned components of mobile terminal 102, for example, RF transceiver 204, baseband modem 206, and application processor 208 may be implemented in a number of different manners, such as by hardware, firmware, software executed on hardware (e.g. a processor), or any combination thereof. Various option include analog circuit(s), digital circuit(s), logic circuit(s), processor(s), microprocessor(s), controller(s), microcontroller(s), scalar processor(s), vector processor(s), Central Processing Unit(s) (CPU), Graphics Processing Unit(s) (GPU), Digital Signal Processor(s) (DSP), Field Programmable Gate Array(s) (FPGA), integrated circuit(s), or Application Specific Integrated Circuit(s) (ASIC).

As shown in in FIG. 2, the aforementioned components of mobile terminal 102 may be implemented as separate components. However, it is appreciated that the architecture of mobile terminal 102 depicted in FIG. 2 is for purposes of explanation, and accordingly one or more of the aforementioned components of mobile terminal 102 may be integrated into a single equivalent component or divided into two separate components with collective equivalence. It is understood that mobile terminal 102 may have one or more additional components, such as additional hardware, software, or firmware elements. For example, mobile terminal 102 may further include various additional components including hardware, firmware, processors, microprocessors, memory, and other specialty or generic hardware/processors/circuits, etc., in order to support a variety of additional operations. Mobile terminal 102 may also include a variety of user input/output devices (display(s), keypad(s), touchscreen(s), speaker(s), external button(s), camera(s), microphone(s), etc.), peripheral device(s), memory, power supply, external device interface(s), subscriber identify module(s) (SIM) etc.

As will be detailed, in an aspect of the disclosure mobile terminal 102 may be a mobile terminal device having a radio processing circuit (RF transceiver 204) and a baseband processing circuit (baseband modem 206) adapted to interact with the radio processing circuit. Mobile terminal 102 may be configured to provide each of a plurality of samples of a frequency-domain signal sequence as input to each of a plurality of inverse frequency transform computations, execute the plurality of inverse frequency transform computations to obtain a plurality of intermediate transforms, wherein each of the plurality of intermediate transforms are composed of a respective plurality of samples, combine the respective plurality of samples of each of the plurality of intermediate transforms to obtain a time-domain representation of the frequency-domain signal sequence, and generate a random access preamble with the time-domain representation of the frequency-domain signal sequence. Additionally and/or alternatively, mobile terminal 102 may be configured to identify a preamble frequency position in the frequency domain, execute a plurality of inverse frequency transform computations on each of a plurality of samples of a frequency-domain signal sequence to obtain a plurality of intermediate transforms, wherein each of the plurality of intermediate transforms are composed of a plurality of samples, apply a respective frequency shift to each sample of the plurality of samples of each of the plurality of intermediate transforms to generate a respective plurality of frequency-shifted samples for each of the plurality of intermediate transforms, wherein each respective frequency shift is dependent on the preamble frequency position, and combine the respective plurality of frequency-shifted samples of each of the plurality of intermediate transforms to generate a time-domain representation of the frequency-domain signal sequence.

Further according to the abridged overview of operation of mobile terminal 102, RF transceiver circuitry 204 may receive radio frequency wireless signals via antenna 202, which may be implemented as e.g. a single antenna or an antenna array composed of multiple antennas. RF transceiver circuitry 204 may include various reception circuitry elements, which may include e.g. analog circuitry, configured to process externally received signals, such as mixing circuitry to convert externally received RF signals to baseband and/or intermediate frequencies. RF transceiver circuitry 204 may also include amplification circuitry to amplify externally received signals, such as power amplifiers (PAs) and/or Low Noise Amplifiers (LNAs), although it is appreciated that such components may also be implemented separately. RF transceiver circuitry 204 may additionally include various transmission circuitry elements configured to transmit internally received signals, such as e.g. baseband and/or intermediate frequency signals provided by baseband modem 206, which may include mixing circuitry to modulate internally received signals onto one or more radio frequency carrier waves and/or amplification circuitry to amplify internally received signals before transmission. RF transceiver circuitry 204 may provide such signals to antenna 202 for wireless transmission. Further references herein to reception and/or transmission of wireless signals by mobile terminal 102 may thus be understood as an interaction between antenna 202, RF transceiver circuitry 204, and baseband modem 206 as detailed above. Although not explicitly depicted in FIG. 2, RF transceiver circuitry 204 may be additionally be connected to application processor 208.

Receiver activating/deactivating circuit 212 may be a circuit separate from modem 212, or may be implemented within modem 210, e.g. by RF transceiver circuitry 204 and/or by baseband modem 206. Mobile terminal 102 may further include cell detection circuit 214 (which may be implemented by baseband modem 206) configured to execute a cell detection procedure using the one or more synchronization signals, thereby determining macrocell timing, e.g. an updated macrocell timing. Moreover, mobile terminal may include memory 216 coupled to modem 210, e.g. to baseband modem 206, to store the one or more macrocell timing values, e.g. determined by baseband modem 206, e.g. updated macrocell timing value(s).

In various aspects of this disclosure, base station 110 transmits radio signals 120a, 120b, to mobile terminals 102, 104. Radio signals may include 120a, 120b various information items including control data and use data. By way of example, base station 110 transmits radio signals 120a, 120b to mobile terminals 102, 104 in radio frames. Radio signals 120a, 120b may include synchronisation signals such as e.g. PSS and/or SSS, e.g. cyclic prefix signals. Furthermore, radio signals 120a, 120b may include OFDM symbols.

Figure 3:
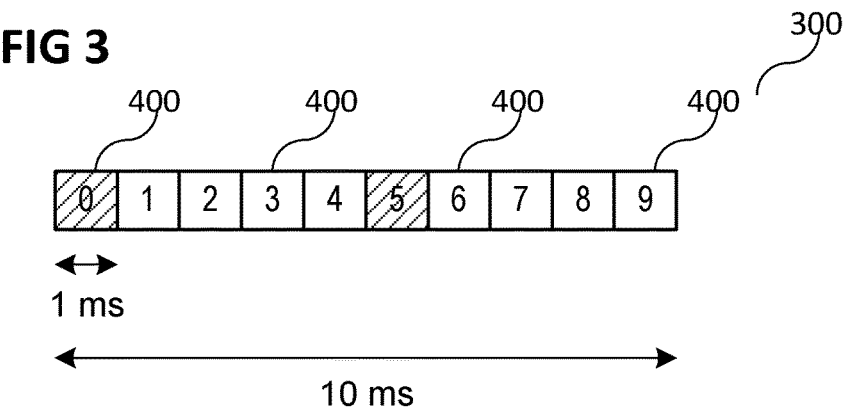
FIG. 3 shows a radio frame structure in accordance with LTE.
Figure 4:
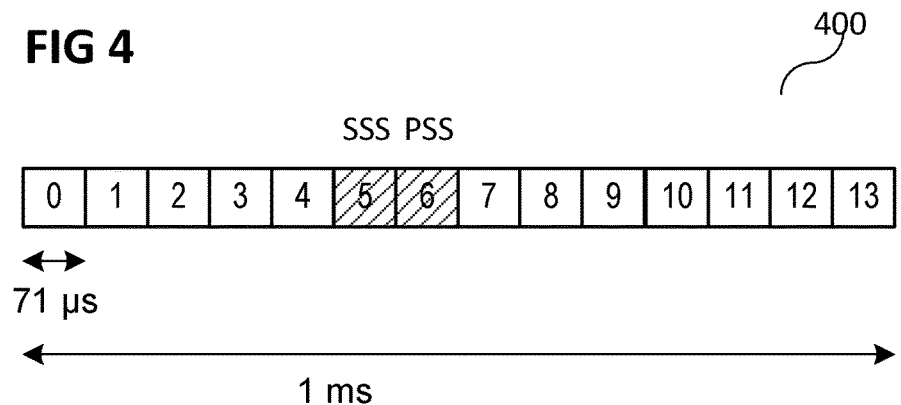
FIG. 4 shows a subframe structure of a radio frame in accordance with LTE.

FIG. 3 shows a typical radio frame 300 structure in accordance with LTE. Each radio frame 300 of length 10 ms consists of 10 subframes 400 as shown in FIG. 4, each of length 1 ms (in case of the so-called normal cyclic prefix length). In case of a so-called extended cyclic prefix length, there are also 10 subframes 400 (symbols), but the mapping of SSS and PSS to the subframe (symbol) number is different. Thus, there is no limitation to the specific radio frame structure and e.g. the number of contained subframes or the exact way of mapping of SSS and PSS to the subframe (symbol) number. The radio frame 300 structure is always repeated. In subframe #0 and subframe #5, both PSS (primary synchronisation signal) and SSS (secondary synchronisation signal) are transmitted (see TS 36.211). To find mobile radio cells with arbitrary timings, a minimum of roughly 5.4 ms radio samples need to be used for the correlation to ensure that at least one PSS and one SSS is available.

FIG. 2 shows a detailed structure of one subframe 400 for FDD given with normal cyclic prefix. It consists of 14 OFDMA symbols with SSS and PSS being part of the 14 OFDMA symbols (it is to be noted that e.g. in case of the extended cyclic prefix, the subframe may consist of 12 OFDMA symbols), and the SSS is transmitted in symbol #5 and PSS is transmitted in symbol #6 (see TS 36.211). As a paging channel is always transmitted in subframe #0, subframe #4, subframe #5 or subframe #9 (for FDD duplex mode), the following two situation can occur:

Paging in Subframe #0 and Subframe #5:
 Paging and PSS/SSS of the serving mobile radio cell occur in the same radio frame 300. Samples for 1 ms mobile radio cell detection are the same as for the paging channel, hence no additional RF samples need.

Paging in Subframe #4 and Subframe #9:

PSS/SSS occur in the subframe directly after the paging subframe, which leads to only 1 ms extra radio samples. Since usually the modem is activated for the paging subframe and one or two subsequent subframes (usually for two subsequent subframes), radio samples for synchronisation may be taken from samples taken by an active modem even in discontinuous reception mode (DRX mode) which may still be activated due to the reception of a paging channel, in other words a paging subframe. Thus, no additional measurements of radio samples may be necessary for synchronisation.

By way of example, in case paging signal is transmitted in subframe #9, modem may still be activated for one or two additional immediately subsequent subframes, for example subframe #0 and subframe #1, for example to measure neighbouring mobile radio cells. This may result in an overlap of the received paging subframes and those subframes including synchronisation signals such as for example PSS and SSS.

Illustratively, in various aspects of this disclosure, measurement phases are used for the searching of a mobile radio cell, in other words for searching for the timing of a serving mobile radio cell. It is to be noted that usually mobile terminals 102, 104 are already synchronised with the respective serving mobile radio cell which provides the paging signals.

Illustratively, base station 110 transmits paging signals as radio signals 120a, 120b, to mobile terminals 102, 104 in accordance with LTE.

In this exemplary scenario, mobile terminals 102, 104 may be in radio resource control (RRC) IDLE state (also referred to as RRC IDLE mode).

i) During RRC IDLE mode, mobile terminals 102, 104 get into and stay in sleeping mode defined in DRX cycle (Discontinous Receive Cycle). (This DRX is cycle may be defined in system information block 2 (SIB2)).

ii) Mobile terminals 102, 104 may periodically wake up and monitor Physical Downlink Control Channel (PDCCH) in order to check for the presence of a paging message (by way of example, mobile terminals 102, 104 look for any information encrypted by P-RNTI (Paging Radio Network Temporary Identifier)).

iii) If the PDCCH indicates that a paging message is transmitted in the subframe, then mobile terminals 102, 104 may need to demodulate the PCH (Paging Channel) to see if the paging message is directed to it.

It is to be noted that paging signals, for example in the form of paging messages, are sent by a MME (mobility management entity) to all base stations 110, for example eNodeBs 110, in a Tracking Area and those base stations 110, for example eNodeBs 110, in a Tracking Area are transmitting the same paging message.

Furthermore, it is to be noted that each base station 110, for example each eNodeB 110, may contain mobile radio cells belonging to different tracking areas but each mobile radio cell can only belong to one Tracking Area.

Various aspects of this disclosure may reduce the overall additional radio samples or even does not require any additional radio samples to quickly detect any timing jumps of the serving mobile radio cell. The detection of the serving mobile radio cell is based on correlation of received radio samples containing the primary and secondary synchronization channel (PSS and SSS).

By way of example, radio samples may be used for synchronisation, in other words for determining the timing of a mobile radio cell, which are already determined and used by mobile terminals 102, 104 to measure, in other words detect, serving mobile radio cell and/or neighboring mobile radio themselves.

Figure 5:
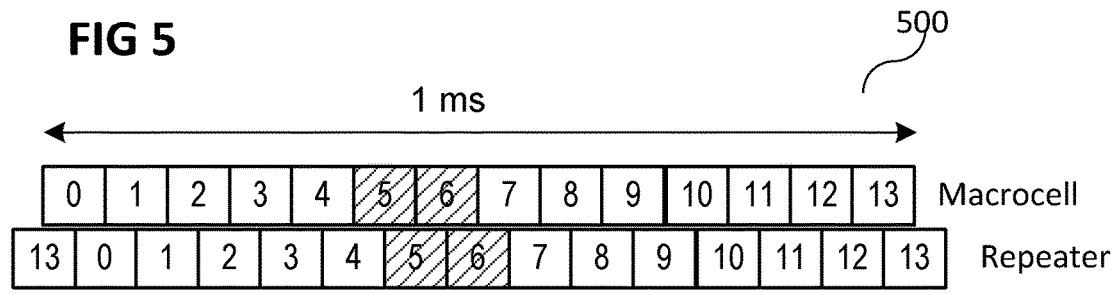
FIG. 5 shows a possible time overlap of subframes of a radio frame in accordance with LTE.

FIG. 5 shows a possible time overlap of subframes of a radio frame in accordance with LTE in a diagram 500. As shown in FIG. 5, a timing overlap as seen by the receiver (e.g. modem 210) is shown. In this example, the timing used by the receiver (e.g. by modem 210) (e.g. for the paging reception) is based on the timing observed from the macrocell. Hence, e.g. the 1 ms used for mobile radio cell detection may be aligned with the macrocell. The timings as seen from the repeater may be shifted e.g. by 30 µs (around ½ OFDM symbol), e.g. due to a repeater being in the signalling flow between base station 110 and mobile terminal 102, 104, or for any other reason. By applying a scheme in accordance with various aspects of this disclosure, even time offsets can be handled that are within e.g. the size of a subframe, e.g. the 1 ms radio samples used for the mobile radio cell search.

Figure 6:
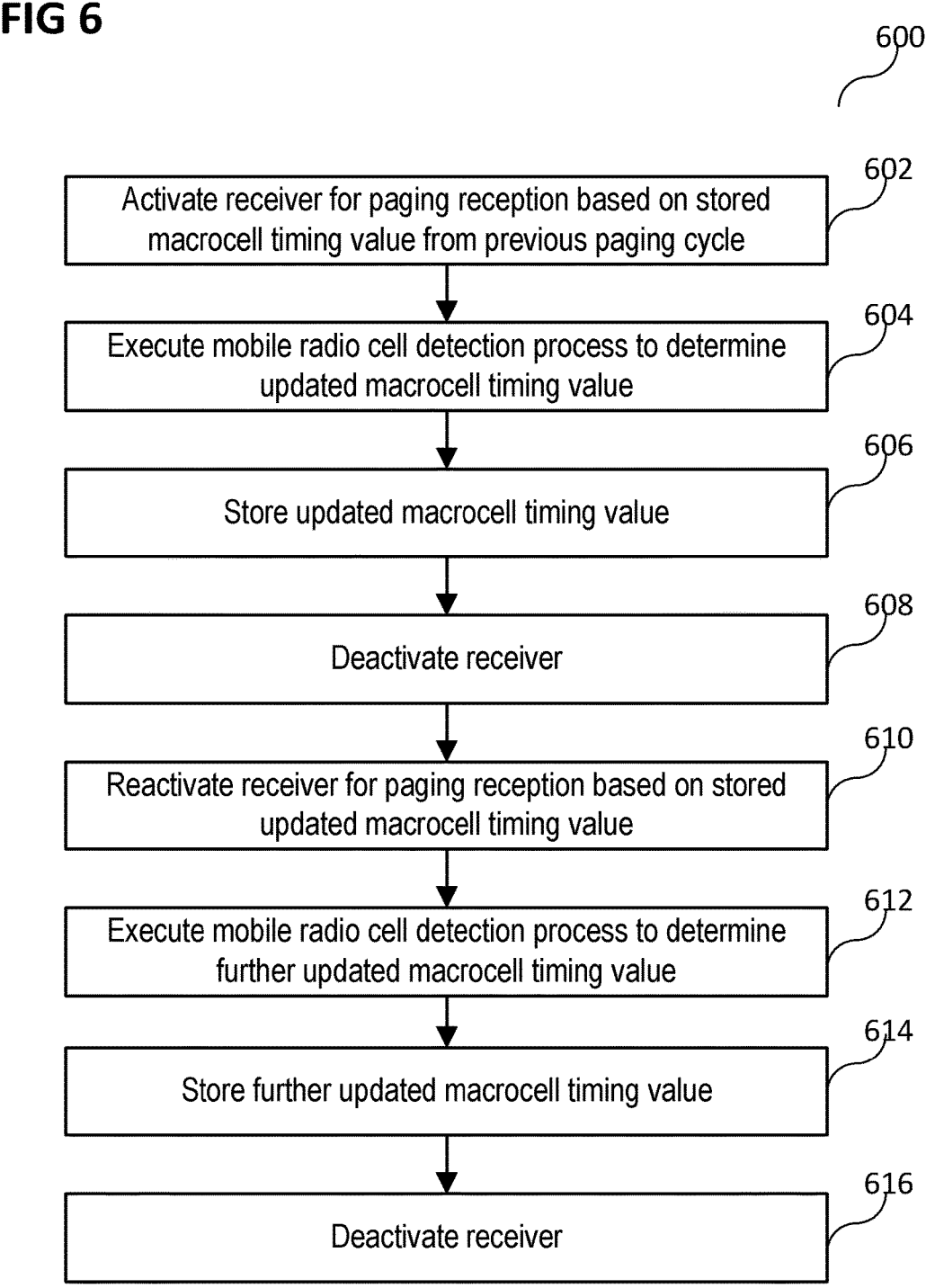
FIG. 6 shows a method for serving mobile radio cell timing determination.

The overall procedure in accordance with various aspects of this disclosure to execute a 1 ms serving mobile radio cell timing estimate while the receiver (e.g. the modem 210) is in RRC IDLE state may be provided as follows (see flow diagram 600 in FIG. 6) (by way of example, the modem 210, e.g. the baseband modem 206, may carry out the method):

Method 600 may include, in 602, controlling the receiver activating/deactivating circuit 212 to activate (switch on) the receiver (in other words switch on modem 210, e.g. entire modem 210 or selectively RF transceiver circuitry 204 and baseband modem 206, depending on which circuit(s) were previously deactivated) for paging reception based on the stored timing from last paging cycle for e.g. either 1 ms (in case paging signal is transmitted in subframe #0 or subframe #5) or for e.g. 2 ms (in case paging signal is transmitted in subframe #4 or subframe #9). Then, modem 210 may, in 604, execute a mobile radio cell detection process with e.g. 1 ms duration. The result of this process is, inter alia, e.g. an updated (new) macrocell timing value, which is stored in 606. Then, in 608, method 600 may include controlling the receiver activating/deactivating circuit 212 to deactivate (switch off) the receiver (in other words switch off modem 210, e.g. entire modem 210 or selectively RF transceiver circuitry 204 and baseband modem 206). In 610, method 600 may include controlling the receiver activating/deactivating circuit 212 to reactivate (switch on again) the receiver (in other words switch on modem 210, e.g. entire modem 210 or selectively RF transceiver circuitry 204 and baseband modem 206, depending on which circuit(s) were previously deactivated) for paging reception based on the stored updated timing from last cell detection process. In other words, illustratively, the found new timing of the serving mobile radio cell will be used at the next paging cycle. Furthermore, method 600 may include, in 612, execute a further mobile radio cell detection process e.g. with 1 ms duration. The result of this process is, inter alia, e.g. a further updated (further new) macrocell timing value, which may be stored in 614. Then, in 616, method 600 may include controlling the receiver activating/deactivating circuit 212 to again deactivate (again switch off) the receiver (in other words switch off modem 210, e.g. entire modem 210 or selectively RF transceiver circuitry 204 and baseband modem 206). This activation/deactivation cycle based on respectively updated macrocell timing and including executing cell detection to determine a respectively updated macrocell timing value can be repeated an arbitrary number of times.

This procedure may be used in the following use cases, for example:

No intra-frequency measurements are required from 3GPP perspective as the quality of the serving mobile radio cell is above the 3GPP defined quality criteria (e.g. $S_{IntraSearch}$).

Intra-frequency measurements are required from 3GPP perspective. The UE implementation might decide not to execute a search for any neighbor on intra-frequency in each paging cycle.

Additionally, it is to be noted that the same procedure can be provided to track the serving mobile radio cell timing when mobile terminal 102, 104 is in RRC CONNECTED state, e.g. wile C-DRX (Discontinuous Reception) is used.

Furthermore, various aspects of this disclosure are not limited to FDD duplex mode, but may also be applied for TDD (time division duplex) mode. In TDD, the paging channel is either in subframe #0, subframe #1, subframe #5 subframe or #6, where the PSS is transmitted in subframe #1 and subframe #6, and SSS is transmitted in subframe #0 and subframe #5.

Figure 7:
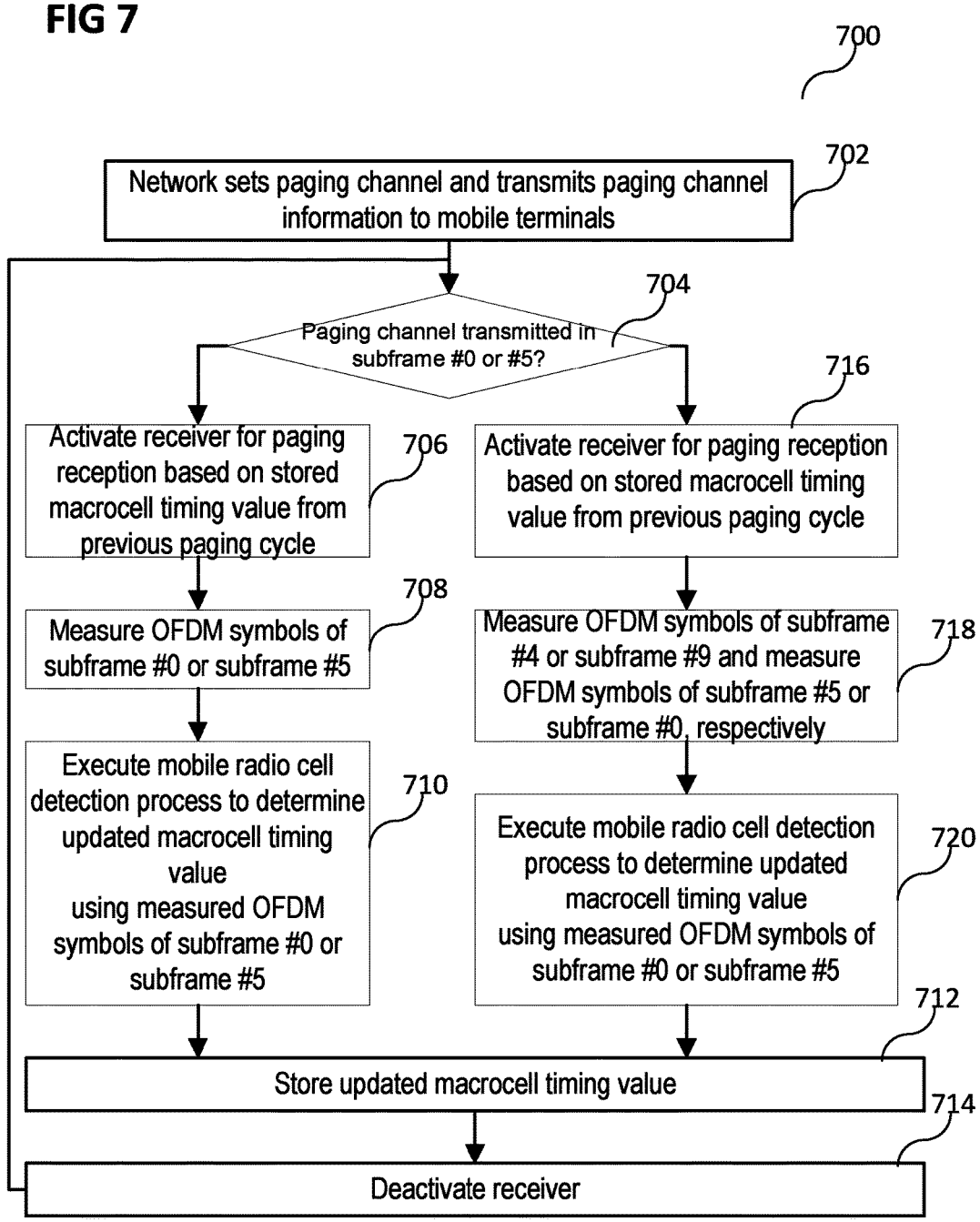
FIG. 7 shows a method for serving mobile radio cell timing determination.

FIG. 7 shows a flow diagram illustrating a method 700 for serving mobile radio cell timing determination. For this example, it will be assumed that the communications system is configured on accordance with LTE. Furthermore, it will be assumed that mobile terminals 102, 104 are working in FDD mode. In 702, network, e.g. base station 110, e.g. eNodeB 110, sets paging channel transmission, namely in which subframe paging channel is transmitted. Paging channel information is configured by the network and may be transmitted from eNodeB 110 to mobile terminals 102, 104, e.g. using a system information block SIB2 which includes the default paging configuration. Furthermore, mobile terminal 102, 104 (e.g. UE) dedicated paging configuration and thus the transmission of the mobile terminal 102, 104 (e.g. UE) dedicated paging channel information may be part of a dedicated signalling process, e.g. carried out during the attach process of the respective mobile terminal 102, 104 (e.g. UE). As described earlier, paging channel is always transmitted in subframe #0, subframe #4, subframe #5 or subframe #9 (for FDD duplex mode), the following two situation can thus occur:

Paging in Subframe #0 and Subframe #5:

Paging and PSS/SSS of the serving mobile radio cell occur in the same radio frame 300. Samples for 1 ms mobile radio cell detection are the same as for the paging channel, hence no additional RF samples need.

Paging in Subframe #4 and Subframe #9:

PSS/SSS occur in the subframe directly after the paging subframe, which leads to only 1 ms extra radio samples. Since usually the modem is activated for the paging subframe and one or two subsequent subframes (usually for two subsequent subframes), radio samples for synchronisation may be taken from samples taken by an active modem even in discontinuous reception mode (DRX mode) which may still be activated due to the reception of a paging channel, in other words a paging subframe. Thus, no additional measurements of radio samples may be necessary for synchronisation.

Then, in 704, mobile terminal 102, 104, e.g. a modem controller (not shown) of the mobile terminal 102, 104 may determine, using the received paging channel information from eNodeB 110, whether paging channel is transmitted in subframe #0 or subframe #5.

In case paging channel is transmitted in subframe #0 or subframe #5 ("Yes" in 704), mobile terminal 102, 104 may, in 706, activate receiver for paging signal reception based on stored macrocell timing value from previous paging cycle. Then, method 700 continues in 708 measuring radio samples, e.g. OFDM symbols of subframe #0 or subframe #5, respectively. Since the synchronisation symbols such as PSS and SSS are also included in subframe #0 and subframe #5, respectively, mobile terminals 102, 104, may re-use the already measured radio samples in executing (in 710) mobile radio cell detection process to determine updated macrocell timing value using the already measured OFDM symbols of subframe #0 or subframe #5, e.g. using PSS and SSS symbols. The result of this process is, inter alia, e.g. an updated (new) macrocell timing value, which is stored in 712. Then, in 714, method 700 may include controlling the receiver activating/deactivating circuit 212 to deactivate (switch off) the receiver (in other words switch off modem 210, e.g. entire modem 210 or selectively RF transceiver circuitry 204 and baseband modem 206). Method 700 may then continue in 704 to repeat the respecting method.

In case paging channel is not transmitted in subframe #0 or subframe #5 ("No" in 704), which means that paging channel is transmitted in subframe #4 or subframe #9, mobile terminal 102, 104 may, in 716, activate receiver for paging signal reception based on stored macrocell timing value from previous paging cycle. It is to be noted that the respective configuration of the paging channel is known a priori to the UE as described above, i.e. it is known to the mobile terminal 102, 104 in which subframe the paging channel is transmitted.

Then, method 700 continues in 718 measuring radio samples, e.g. OFDM symbols of subframe #4 or subframe #9, respectively. Furthermore, mobile terminal 102, 104 may also measure radio samples, e.g. OFDM symbols of the respectively immediately subsequent subframe, i.e. of subframe #5 or subframe #0, e.g. also in order to measure neighboring mobile radio cells. Thus, in this case, receiver may be actived for one more subframe to measure also the subframe #5 or subframe #0 and thus to measure those OFDM symbols which can be re-used for synchronisation purposes, such as e.g. PSS and SSS. Since the synchronisation symbols such as PSS and SSS are also included in subframe #0 and subframe #5, respectively, mobile terminals 102, 104, may re-use the than also already measured radio samples in executing (in 720) mobile radio cell detection process to determine updated macrocell timing value using the already measured OFDM symbols of subframe #0 or subframe #5, e.g. using PSS and SSS symbols. The result of this process is, inter alia, e.g. an updated (new) macrocell timing value, which is stored in 712. Then, in 714, method 700 may include controlling the receiver activating/deactivating circuit 212 to deactivate (switch off) the receiver (in other words switch off modem 210, e.g. entire modem 210 or selectively RF transceiver circuitry 204 and baseband modem 206). Method 700 may then continue in 704 to repeat the respecting method.

Moreover, various aspects are not limited to a scenario including one or more repeaters, but may in general be provided to determine and update macrocell timing. Further, various aspects of this disclosure may be provided to detect as to whether a macrocell does still exist or not; thus, the detection that a problem exists with the serving mobile radio cell may be accelerated.

Figure 8:
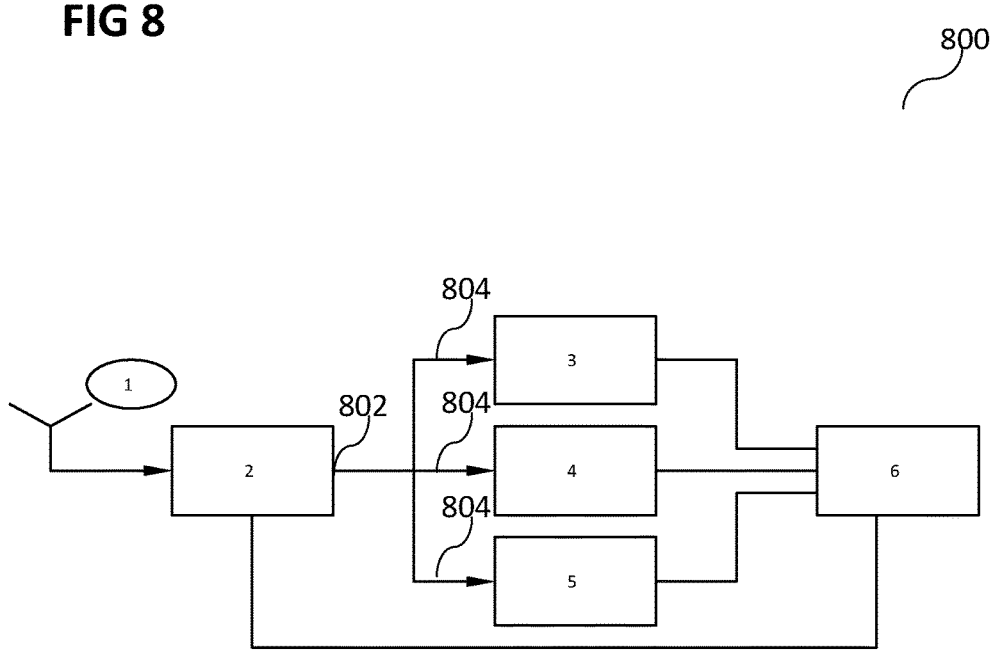
FIG. 8 shows a mobile terminal in accordance with LTE.

FIG. 8 shows a mobile terminal 800 (which may be similar to mobile terminals 102, 104) in accordance with LTE. Mobile terminal 800 may include an antenna 1 and an RF transceiver circuit 2 (including an RF receiver circuit). RF transceiver circuit 2 may be configured to demodulate radio signals (e.g. radio signals 120*a*, 120*b*) received via antenna 1 and to provide corresponding (e.g. digital) baseband signals 804 at its output 802. Mobile terminal 800 may further include a circuit 3 configured to receive a paging signal included in the received and demodulated radio signals, a measurement circuit 4 configured to carry out radio signal measurements, e.g. RSRP or RSRQ measurements with respect to the received and demodulated radio signals, and a cell search circuit 5 configured to execute a mobile radio cell search procedure in accordance with LTE. Mobile terminal 800 may further include a central controller 6. RF transceiver circuit 2 may supply (e.g. digital) baseband signals simultaneously to all three circuits 3, 4, 5, i.e. to circuit 3 configured to receive a paging signal, to measurement circuit 4 and to cell search circuit 5. Each of the circuits 3, 4, 5 may independently from each other process the supplied (e.g. digital) baseband signals in accordance with its specific configuration as e.g. described above.

Central controller 6 may centrally control signal processing in general. By way of example, central controller 6 carries out evaluation of the results of the circuits 3, 4, 5. Measurement circuit 4 may be configured to carry out the measurement of neighboring radio cells, which only requires a short time interval (e.g. 3 ms). At the same time, cell search circuit 5 may be configured to detect the synchronisation signals of the serving mobile radio cell. This detection may require only one signal of a duration of 1 to 2 ms due to the already known characteristics. Thus, previously described processes such as e.g. 708, 710, or 718, 720, may also be carried out simultaneously.

Central controller 6 may evaluate the measured mobile radio cell timing of the serving mobile radio cell. In case central controller 6 detects a deviation of the measured mobile radio cell timing from the previously stored timing (e.g. from a previous paging cycle) which is greater than a predetermined or predefined threshold value, this newly detected measured mobile radio cell timing may be used in the next paging cycle as a new timing value, as described above.

As described above, in accordance with LTE, the overall signal is built from several radio channels and signals. Hence, in various aspects of this disclosure, the paging channel is transmitted together with synchronization signals.

In the following, various aspects of this disclosure will be illustrated:

Example 1 is a radio communication device. The radio communication device may include a circuit arrangement for determining a mobile radio cell timing. The circuit arrangement may include a receiver configured to receive a paging signal in accordance with a predetermined cell timing, and one or more synchronization signals, and a receiver activating/deactivating circuit configured to activate the receiver for a predetermined time period to receive the paging signal in accordance with a previous paging signal cycle, and further configured to deactivate the receiver after the predetermined time period has lapsed. The circuit arrangement may further include a cell detection circuit configured to execute during the predetermined time period a cell detection procedure using the one or more synchronization signals, thereby determining an updated cell timing, and a memory configured to store the updated cell timing.

In Example 2, the subject matter of Example 1 can optionally include that the predetermined time period is one subframe of a radio frame.

In Example 3, the subject matter of Example 1 can optionally include that the predetermined time period is two subframes of a radio frame.

In Example 4, the subject matter of any one of Examples 1 to 3 can optionally include that the receiver activating/deactivating circuit is further configured to re-activate the receiver. The receiver may further be configured to receive a further paging signal in accordance with the stored updated cell timing.

In Example 5, the subject matter of any one of Examples 1 to 4 can optionally include that the cell timing is a macrocell timing, and that the updated cell timing is an updated macrocell timing.

In Example 6, the subject matter of any one of Examples 1 to 5 can optionally include that the one or more synchronization signals comprise one or more Orthogonal Frequency Division Multiplex symbols.

In Example 7, the subject matter of any one of Examples 1 to 6 can optionally include that the circuit arrangement is configured in accordance with a Long Term Evolution communications technology.

In Example 8, the subject matter of Example 7 can optionally include that the circuit arrangement is configured in accordance with a Long Term Evolution Advanced communications technology.

In Example 9, the subject matter of any one of Examples 1 to 8 can optionally include that the receiver is configured to receive the paging signal in accordance with frequency division duplex.

In Example 10, the subject matter of any one of Examples 1 to 8 can optionally include that the receiver is configured to receive the paging signal in accordance with time division duplex.

Example 11 is a mobile radio communication terminal device. The mobile radio communication terminal device may include a receiver configured to receive a paging signal in accordance with a predetermined cell timing, and one or more synchronization signals, and a receiver activating/deactivating circuit configured to activate the receiver for a predetermined time period to receive the paging signal in accordance with a previous paging signal cycle and further configured to deactivate the receiver after the predetermined time period has lapsed. The mobile radio communication terminal device may further include a cell detection circuit configured to execute during the predetermined time period a cell detection procedure using the one or more synchronization signals, thereby determining an updated cell timing, and a memory configured to store the updated cell timing.

In Example 12, the subject matter of Example 11 can optionally include that the predetermined time period is one subframe of a radio frame.

In Example 13, the subject matter of Example 11 can optionally include that the predetermined time period is two subframes of a radio frame.

In Example 14, the subject matter of any one of Examples 11 to 13 can optionally include that the receiver activating/deactivating circuit is further configured to re-activate the receiver. The receiver may further be configured to receive a further paging signal in accordance with the stored updated cell timing.

In Example 15, the subject matter of any one of Examples 11 to 14 can optionally include that the cell timing is a macrocell timing, and that the updated cell timing is an updated macrocell timing.

In Example 16, the subject matter of any one of Examples 13 to 15 can optionally include that the one or more synchronization signals comprise one or more Orthogonal Frequency Division Multiplex symbols.

In Example 17, the subject matter of any one of Examples 11 to 16 can optionally include that the mobile radio communication terminal device is configured in accordance with a Long Term Evolution communications technology.

In Example 18, the subject matter of Example 17 can optionally include that the mobile radio communication terminal device is configured in accordance with a Long Term Evolution Advanced communications technology.

In Example 19, the subject matter of any one of Examples 11 to 18 can optionally include that the receiver is configured to receive the paging signal in accordance with frequency division duplex.

In Example 20, the subject matter of any one of Examples 11 to 18 can optionally include that the receiver is configured to receive the paging signal in accordance with time division duplex.

Example 21 is a method of determining a mobile radio cell timing. The method may include activating a receiver for a predetermined time period to receive a paging signal in accordance with a previous paging signal cycle and one or more synchronization signals, receiving the paging signal in accordance with a predetermined cell timing, executing a cell detection procedure using the one or more synchronization signals, thereby determining an updated cell timing, deactivating the receiver after the predetermined time period has lapsed, and storing the updated cell timing.

In Example 22, the subject matter of Example 21 can optionally include that the predetermined time period is one subframe of a radio frame.

In Example 23, the subject matter of Example 21 can optionally include that the predetermined time period is two subframes of a radio frame.

In Example 24, the subject matter of any one of Examples 21 to 23 can optionally include that the method further includes re-activating the receiver, and receiving a further paging signal in accordance with the stored updated cell timing.

In Example 25, the subject matter of any one of Examples 21 to 24 can optionally include that the cell timing is a macrocell timing, and that the updated cell timing is an updated macrocell timing.

In Example 26, the subject matter of any one of Examples 21 to 25 can optionally include that the one or more synchronization signals comprise one or more Orthogonal Frequency Division Multiplex symbols.

In Example 27, the subject matter of any one of Examples 21 to 26 can optionally include that the method is carried out in accordance with a Long Term Evolution communications technology.

In Example 28, the subject matter of Example 27 can optionally include that the method is carried out in accordance with a Long Term Evolution Advanced communications technology.

In Example 29, the subject matter of any one of Examples 21 to 28 can optionally include that the method is carried out by a mobile radio communication terminal device.

In Example 30, the subject matter of Example 29 can optionally include that the mobile radio communication terminal device is a mobile radio communication terminal device in accordance with a Long Term Evolution communications technology. The mobile radio communication terminal device is carrying out the method while it is in Radio Resource Control Idle state.

In Example 31, the subject matter of Example 29 can optionally include that the mobile radio communication terminal device is a mobile radio communication terminal device in accordance with a Long Term Evolution communications technology. The mobile radio communication terminal device is carrying out the method while it is in Radio Resource Control Connected state.

In Example 32, the subject matter of any one of Examples 29 to 31 can optionally include that the paging signal is received in accordance with frequency division duplex.

In Example 32, the subject matter of any one of Examples 29 to 31 can optionally include that the paging signal is received in accordance with time division duplex.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A circuit arrangement for determining a mobile radio cell timing, the circuit arrangement comprising:
   a receiver configured to receive a paging signal in accordance with a predetermined cell timing, the paging signal comprising at least one of two subframes of a radio frame, and configured to receive one or more synchronization signals;
   a receiver activating/deactivating circuit configured to activate the receiver for a predetermined time period to receive the paging signal in accordance with a previous paging signal cycle, and further configured to deactivate the receiver after the predetermined time period has lapsed;
   a cell detection circuit configured to execute, during the predetermined time period, a cell detection procedure, the cell detection procedure performed by use of the one or more synchronization signals, thereby determining an updated cell timing; and
   a memory configured to store the updated cell timing.

2. The circuit arrangement of claim 1,
   wherein the predetermined time period is one subframe of a radio frame.

3. The circuit arrangement of claim 1,
   wherein the predetermined time period is two subframes of a radio frame.

4. The circuit arrangement of claim 1,
   wherein the receiver activating/deactivating circuit is further configured to re-activate the receiver;
   wherein the receiver is further configured to receive a further paging signal in accordance with the stored updated cell timing.

5. The circuit arrangement of claim 1,
   wherein the cell timing is a macrocell timing; and
   wherein the updated cell timing is an updated macrocell timing.

6. The circuit arrangement of claim 1,
   wherein the one or more synchronization signals comprise one or more Orthogonal Frequency Division Multiplex symbols.

7. The circuit arrangement of claim 1,
   configured in accordance with a Long Term Evolution communications technology.

8. The circuit arrangement of claim 1,
   wherein the receiver is configured to receive the paging signal in accordance with frequency division duplex.

9. A mobile radio communication terminal device, comprising:
- a receiver configured to receive a paging signal in accordance with a predetermined cell timing, the paging signal comprising at least one of two subframes of a radio frame, and configured to receive one or more synchronization signals;
- a receiver activating/deactivating circuit configured to activate the receiver for a predetermined time period to receive the paging signal in accordance with a previous paging signal cycle and further configured to deactivate the receiver after the predetermined time period has lapsed;
- a cell detection circuit configured to execute during the predetermined time period a cell detection procedure, the cell detection procedure performed by use of the one or more synchronization signals, thereby determining an updated cell timing; and
- a memory configured to store the updated cell timing.

10. The mobile radio communication terminal device of claim 9,
wherein the predetermined time period is one subframe of a radio frame.

11. The mobile radio communication terminal device of claim 9,
wherein the predetermined time period is two subframes of a radio frame.

12. The mobile radio communication terminal device of claim 9,
wherein the receiver activating/deactivating circuit is further configured to re-activate the receiver;
wherein the receiver is further configured to receive a further paging signal in accordance with the stored updated cell timing.

13. The mobile radio communication terminal device of claim 9,
wherein the cell timing is a macrocell timing; and
wherein the updated cell timing is an updated macrocell timing.

14. The mobile radio communication terminal device of claim 9,
wherein the one or more synchronization signals comprise one or more Orthogonal Frequency Division Multiplex symbols.

15. The mobile radio communication terminal device of claim 9,
configured in accordance with a Long Term Evolution communications technology.

16. A method of determining a mobile radio cell timing, the method comprising:
- activating a receiver for a predetermined time period to receive a paging signal in accordance with a previous paging signal cycle, the paging signal comprising at least one of two subframes of a radio frame, and configured to receive one or more synchronization signals;
- receiving the paging signal in accordance with a predetermined cell timing;
- executing a cell detection procedure using the one or more synchronization signals, thereby determining an updated cell timing;
- deactivating the receiver after the predetermined time period has lapsed; and
- storing the updated cell timing.

17. The method of claim 16,
wherein the predetermined time period is one subframe of a radio frame.

18. The method of claim 16,
wherein the predetermined time period is two subframes of a radio frame.

19. The method of claim 16, further comprising:
re-activating the receiver;
receiving a further paging signal in accordance with the stored updated cell timing.

20. The method of claim 16,
wherein the cell timing is a macrocell timing; and
wherein the updated cell timing is an updated macrocell timing.

21. The method of claim 16,
wherein the one or more synchronization signals comprise one or more Orthogonal Frequency Division Multiplex symbols.

22. The method of claim 16,
carried out in accordance with a Long Term Evolution communications technology.

23. The method of claim 16,
carried out by a mobile radio communication terminal device.

24. The method of claim 23,
wherein the mobile radio communication terminal device is a mobile radio communication terminal device in accordance with a Long Term Evolution communications technology;
wherein the mobile radio communication terminal device is carrying out the method while it is in Radio Resource Control Idle state.

25. The method of claim 23,
wherein the mobile radio communication terminal device is a mobile radio communication terminal device in accordance with a Long Term Evolution communications technology;
wherein the mobile radio communication terminal device is carrying out the method while it is in Radio Resource Control Connected state.

* * * * *